(12) United States Patent
Rocha

(10) Patent No.: US 11,425,332 B1
(45) Date of Patent: Aug. 23, 2022

(54) CONFERENCING COMMUNICATION SYSTEM AND METHOD OF USE

(71) Applicant: Miguel A Rocha, Reno, NV (US)

(72) Inventor: Miguel A Rocha, Reno, NV (US)

( * ) Notice: Subject to any disclaimer, the term of this patent is extended or adjusted under 35 U.S.C. 154(b) by 0 days.

(21) Appl. No.: 16/810,505

(22) Filed: Mar. 5, 2020

(51) Int. Cl.
  *H04N 7/14* (2006.01)
  *H04L 51/04* (2022.01)
  *H04M 3/56* (2006.01)

(52) U.S. Cl.
  CPC ............. *H04N 7/147* (2013.01); *H04L 51/04* (2013.01); *H04M 3/567* (2013.01)

(58) Field of Classification Search
  CPC ......... H04N 7/147; H04L 51/04; H04M 3/567
  See application file for complete search history.

(56) References Cited

U.S. PATENT DOCUMENTS

| | | | | |
|---|---|---|---|---|
| 10,152,193 | B1* | 12/2018 | Hurwitz | G06Q 50/00 |
| 2011/0252340 | A1* | 10/2011 | Thomas | G06Q 10/107 |
| | | | | 715/756 |
| 2016/0094684 | A1* | 3/2016 | Pic | H04W 4/21 |
| | | | | 709/203 |
| 2018/0047070 | A1* | 2/2018 | Koenig | G06Q 30/0282 |

* cited by examiner

*Primary Examiner* — Suraj M Joshi
(74) *Attorney, Agent, or Firm* — Leavitt Eldredge Law Firm

(57) ABSTRACT

A conferencing communication system includes a presenter computing device, a plurality of observer computing devices, a communication network and a conferencing communication platform accessible via the presenter computing device and the plurality of observer computing devices. The system also includes a text chat service and a video chat service. The system also includes a compatibility service that connects a presenter with one or more observers based on a predetermined minimum compatibility.

3 Claims, 2 Drawing Sheets

CONFERENCING COMMUNICATION SYSTEM AND METHOD OF USE

BACKGROUND

1. Field of the Invention

The present invention relates generally to communication systems, and more specifically, to a conferencing communication system for facilitating communication between a presenter and one or more observers.

2. Description of Related Art

Conferencing communication systems are known in the art and are effective means to communication between a presenter and a group of observers. Conferencing communication systems may include features such as voice or video chat either live or recorded and/or online webinars live or recorded.

One of the problems commonly associated with conferencing communication systems is the lack of ability for presenters to engage and/or interact with the audience of observers. This can lead to a disconnect during a presentation with limited interaction among the group.

Accordingly, although great strides have been made in the area of conferencing communication systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
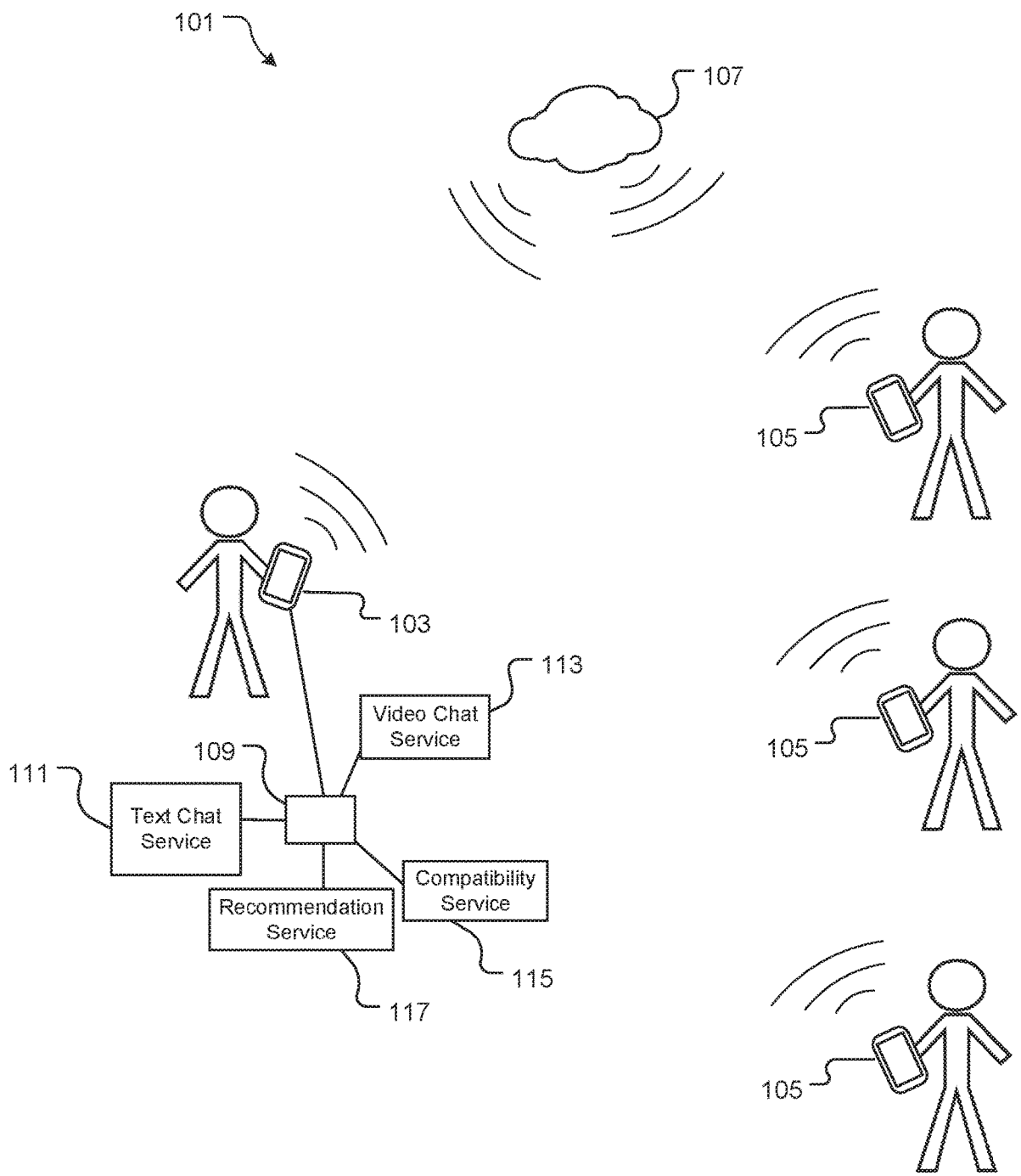
FIG. 1 is a simplified schematic of a conference communication system in accordance with a preferred embodiment of the present application.
Figure 2:
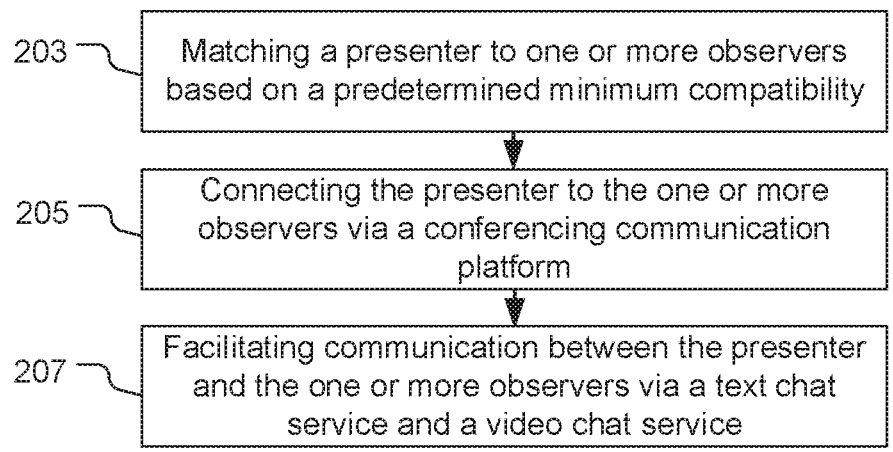
FIG. 2 is a flowchart of a method of conferencing communication.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional conferencing communication systems. Specifically, by matching users based on a predetermined minimum compatibility. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a simplified schematic of a conferencing communication system in accordance with a preferred embodiment of the present application. It will be appreciated that system 101 overcomes one or more of the above-listed problems commonly associated with conventional conferencing communication systems.

In the contemplated embodiment, system 101 includes a presenter computing device 103, a plurality of observer computing devices 105, a communication network 107 and a conferencing communication platform 109. The conferencing communication platform 109 is accessible via the presenter computing device 103 and the plurality of observer computing devices 105. The communication network 107 facilitates communication between the presenter computing device 103 and the plurality of observer computing devices 105.

System 101 also includes a text chat service 111 and a video chat service 113. The services 111 and 113 allow communication between the presenter and the observers via text and/or video. System 101 also includes a compatibility service 115 which makes connections between the presenter and the observers based on a predetermined minimum compatibility.

System 101 may also further include a recommendation service 117. The recommendation service 117 may recommend one or more conversation topics to users based on a determination made by the compatibility service 115.

System 101 may include additional features such as mobile and/or web live video or voice chat speed dating. This may include an admin created event either open for all users of the platform or for specific users based on the user's profile and/or answers to questions. Users may receive an invitation via a platform notification or the like. The user may choose to accept or decline the invitation and send a corresponding RSVP notice. The user may also have the option to invite other users to the event. When the speed dating event starts, a timer indicates a period of time in which users may interact through voice and/or video chat.

It should be appreciated that particular features of the present application are considered novel to system 101 and provide a safer and more personal experience for users. For examples, users may be matched during the event based on the compatibility service 115. Users may have the option of inviting others to connect. Users may also have the option of marking particular content and/or behavior as inappropriate, lewd or otherwise offensive. There may be a "flag" button associated with marking particular content as offensive which may trigger a process of saving a predetermined time (e.g. 60 seconds) of the previous conversation to provide to the admin for review. After review, the admin may determine possible outcomes including cancellation of offending user's membership. The recommendation service 117 may also provide an "ice-breaker" button allowing users to see interesting facts about other users' profiles and recommend conversation topics. This may also include buttons such as "favorite" and "connect" allowing users to interact with other users. The favorite button may allow a user to mark another user for exclusive invitation. The connect button may allow a user to invite another user for other forms of communication and/or to events. Users may receive a recommendation to attend additional events based on feedback received.

Particular features mentioned herein may have additional applications. For example, an admin may create a live or recorded webinar event inviting specific users who may choose to accept or decline and RSVP accordingly. User may be able to view certain user profiles deemed as "top users" based on a determination made by the compatibility service 115. Users may also have the ability to ask and/or answer questions via the text chat service 111 or video chat service 113.

The compatibility service 115 may allow users to choose a compatible percentage required by other users to meet to allow access to contact. There may be a 10% margin in which users may be off a minimum requirement in order to communicate or request a connection.

System 101 may further include a favorite list where users are able to add other users. User profiles listed on a user's favorite list may be accessible and allow exclusive invitations to particular events such as speed dating events, webinar events and the like. Users may be allowed to invite users on their favorite list to attend one or more of these events with them.

Users may be able to send and/or receive connection and communication requests from other users who do not meet the minimum compatibility requirement. Such requests may be accepted or rejected, and a user may be allowed to provide a specific reason for the rejection.

Other features of system 101 may include "Achievement Badges" where users may receive an achievement badge after attending and answering post and/or questions in a prerecorded or live webinar. Particular questions asked may be match up with other users according to a compatibility determination. Users may also have a "Main Badge" associated with the user's profile which may include various statistics associated with the user including questions answered and compatibility percent.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A conferencing communication system, comprising:
   a presenter computing device;
   a plurality of observer computing devices;
   a communication network configured to facilitate communication between the presenter computing device and the plurality of observer computing devices, and between each of the plurality of observer computing devices;
   a conferencing communication platform accessible via the presenter computing device and the plurality of observer computing devices;
   a text chat service integrated into the conferencing communication platform and configured to allow text communication between the presenter computing device and the plurality of observer computing devices, and between each of the plurality of observer computing devices;
   a live video chat service integrated into the conferencing communication platform and configured to allow video communication between the presenter computing device and the plurality of observer computing devices and between each of the plurality of observer computing devices, the live video chat allows a user of the presenter computing device to send text messages via the text chat service and communicate directly with a user of one of the plurality of observer computing devices; and
   a compatibility service integrated into the conferencing communication platform and configured to limit communication in the form of text and video between each of the plurality of observer computer devices and between the plurality of observer computer devices and the presenter computer device based on a predetermined minimum compatibility, the predetermined minimum compatibility is a compatible percentage between two of the plurality of observer computer devices and the presenter computer device and is determined based upon input from each of the plurality of observer computing device, the compatibility service is configured to match the presenter computing device with one or more of the plurality of observer computing device based on the predetermined minimum compatibility;
   wherein the compatibility service further allows for each of the plurality of observer computer devices and the presenter computer device to set an independent compatible percentage required in order for communications to be activated;
   wherein the predetermined minimum compatibility is based off of factors including:
      whether or not the user and a second user attend a same video communication presented by a presenter through the conferencing communication platform; and whether or not the user and the second user each answer a predetermined percentage of questions within the conferencing communication network platform the same.

2. The conferencing communication system of claim 1, wherein the video chat service further includes a conversation recommendation service configured to provide one or more suggestions for conversation topics based on a compatibility determination.

3. A method of conferencing communication, the method comprising:

providing the system of claim 1;

matching a presenter to one or more observers based on the predetermined minimum compatibility;

connecting the presenter to the one or more observers via the conferencing communication platform; and facilitating communication between the presenter and the one or more observers via the text chat service and the video chat service.

* * * * *